(12) United States Patent
Wei

(10) Patent No.: US 7,897,098 B2
(45) Date of Patent: Mar. 1, 2011

(54) HIGH TOTAL TRANSMITTANCE ALUMINA DISCHARGE VESSELS HAVING SUBMICRON GRAIN SIZE

(75) Inventor: George C. Wei, Weston, MA (US)

(73) Assignee: Osram Sylvania Inc., Danvers, MA (US)

( * ) Notice: Subject to any disclaimer, the term of this patent is extended or adjusted under 35 U.S.C. 154(b) by 176 days.

(21) Appl. No.: 11/851,659

(22) Filed: Sep. 7, 2007

(65) Prior Publication Data

US 2008/0042326 A1 Feb. 21, 2008

Related U.S. Application Data

(62) Division of application No. 10/907,014, filed on Mar. 16, 2005, now abandoned.

(51) Int. Cl.
B28B 1/00 (2006.01)
(52) U.S. Cl. .......................................... 264/604; 264/676
(58) Field of Classification Search .................. 264/604, 264/676

See application file for complete search history.

(56) References Cited

U.S. PATENT DOCUMENTS

| | | | | |
|---|---|---|---|---|
| 3,243,635 A * | 3/1966 | Louden et al. | ................. | 313/317 |
| 3,428,846 A * | 2/1969 | Rigden et al. | ................. | 313/284 |
| 4,031,178 A | 6/1977 | Johnson et al. | ................. | 264/65 |
| 4,423,353 A * | 12/1983 | Ogata et al. | ................. | 313/631 |
| 5,861,714 A | 1/1999 | Wei | ................. | 313/625 |
| 5,936,351 A | 8/1999 | Lang | ................. | 313/634 |
| 6,399,528 B1 | 6/2002 | Krell et al. | ................. | 501/80 |
| 6,404,129 B1 | 6/2002 | Hendricx et al. | ................. | 313/620 |
| 6,417,127 B1 | 7/2002 | Yamamoto et al. | ................. | 501/153 |
| 6,796,869 B1 * | 9/2004 | Coxon et al. | ................. | 445/26 |
| 6,844,285 B1 | 1/2005 | Wei | | |
| 7,456,122 B2 * | 11/2008 | Rhodes et al. | ................. | 501/153 |
| 2002/0070667 A1 | 6/2002 | Miyazawa | ................. | 313/634 |
| 2005/0215419 A1 | 9/2005 | Takagimi et al. | | |
| 2005/0275142 A1 | 12/2005 | Niimi | ................. | 264/621 |
| 2006/0169951 A1 | 8/2006 | Van Bruggen et al. | ................. | 252/500 |

FOREIGN PATENT DOCUMENTS

| | | |
|---|---|---|
| EP | 0926106 | 6/1999 |
| EP | 0587238 | 7/2000 |
| EP | 1053983 | 11/2000 |
| EP | 0650184 | 6/2002 |
| EP | 1 251 112 | 10/2002 |
| EP | 1310983 | 5/2003 |

(Continued)

OTHER PUBLICATIONS

R. Apetz et al., Transparent Alumina: A Light-Scattering Model, *J.Am. Ceram. Soc.*, 86(3) 408-86 (2003).

(Continued)

*Primary Examiner* — Matthew J. Daniels
*Assistant Examiner* — Russell J Kemmerle, III
(74) *Attorney, Agent, or Firm* — Robert F. Clark

(57) ABSTRACT

The present invention uses a post-sinter-HIP anneal to increase the total transmittance of ceramic discharge vessels comprised of a submicron-grained alumina doped with MgO. After the anneal, the submicron-grained alumina discharge vessels have high values of both total and in-line transmittance, and are thus suitable for use in focused-beam, short-arc lamps. In particular, the total transmittance of the discharge vessel is increased to greater than 92% in the wavelength range from about 400 nm to about 700 nm.

12 Claims, 2 Drawing Sheets

FOREIGN PATENT DOCUMENTS

| | | |
|---|---|---|
| JP | 6-211569 | 8/1994 |
| JP | 2001-199761 | 7/2001 |
| JP | 2004 315313 | 11/2004 |
| WO | WO 00/67294 | 11/2000 |
| WO | WO 02/17350 | 2/2002 |
| WO | WO 03/057065 | 7/2003 |
| WO | WO 2004/007397 | 1/2004 |
| WO | WO 2004/067474 | 8/2004 |
| WO | WO 2005/088679 | 9/2005 |

OTHER PUBLICATIONS

A. Krell et al., Transparent Sintered Corundum with High Hardness and Strength, *J. Am. Ceram. Soc.*, 86 (1) 12-18 (2003).

A. Krell et al., Processing of High-Density Submicrometer $Al_2O_3$ for New Applications, *J. Am. Ceram. Soc.*, 86 (4) 546-53 (2003).

A. Krell et al., High Purity Submicron $\alpha$-$Al_2O_3$ Armor Ceramics Design; Manufacture; and Ballistic Performance, *Cer. Trans.*, vol. 134, Am. Cer. Soc., Westerville OH (2002).

K. Hayashi et al., Transmission Optical Properties of Polycrystalline Alumina with Submicron Grains, *Mater. Trans., JIM*, vol. 32 n. 11, 1024-1029 (1991).

K. Morinaga et al., Fabrication of Fine $\alpha$-Alumina Powders by Thermal Decomposition of Ammonium Aluminum Carbonate Hydroxide (AACH), *Acta Mater.*, 48 (2000) 4735-4741.

H. Mizuta et al., Preparation of High-Strength and Translucent Alumina by Hot Isostatic Pressing, *J. Am. Ceram. Soc.*, 75(2) 469-73 (1992).

H. Yoshimura et al., Translucent Polycrystalline Alumina: Influence of Roughness and Thickness on in-line Transmittance, *Mat. Sci. Forum*, vol. 299-300 (1999) pp. 35-43.

S. Iio, Microstructure Control of Polycrystalline Alumina with Submicron Grain Size for Light Transparency, American Ceramic Society, 104th Annual Meeting & Exposition, St. Louis, MO (2002).

T. Mitsuoka et al., Improvement in High-Temperature Properties of $Al_2O_3$ Ceramics by Microstructure and Grain Boundary Control, *Key Engineering Materials*, vol. 247 (2003) pp. 349-354.

C. Greskovich et al., Solubility of Magnesia in Polycrystalline Alumina at High Temperature, *J. Am. Ceram. Soc.*, 84(2) 420-25 (2001).

L. Brock et al., Color Centers in Magnesium Doped Polycrystalline Alumina, *Proc. MRS Symposium*, (2001).

G. Wei, Characterization of Translucent Polycrystalline Alumina (PCA) Ceramics, *Cer. Trans.*, vol. 133, *Improved Ceramics through New Measurements, Processing, and Standards*, ed. M. Matsui et al., American Ceramic Society, Westerville, OH (2002) 135-144.

G. Wei, Current Trends in Ceramics for the Lighting Industry, *Key Engineering Materials*, vol. 247, ed. H. Suzuki et al., Trans Tech Publications, Switzerland (2003) pp. 461-466.

K. Lagerlöf et al., The Defect Chemistry of Sapphire ($\alpha$-$Al_2O_3$), *Acta Mater.*, 46(16) (1998) 5689-5700.

S. Mohapatra et al., Defect Structure of $\alpha$-$Al_2O_3$ $_{1\,Doped\,with\,Magnesium}$, *J. Am. Ceram. Soc.*, 60 (3-4) 1977 141-148.

Otani et al., Effects of the polycrystalline alumina arc tube transparency on the efficacy of the high pressure sodium lamps, *Journal Light and Vis. Env.* 3 [2] 18-23 (1979).

G. Wei, Characterization of Translucent Polycrystalline Alumina (PCA) Ceramics, Pacific Rim IV Conference (Nov. 6, 2001).

J.J. de Groot et al., The High Pressure Sodium Lamp, Kluwer Technische Boeken B.V. (1986) pp. 234-239.

J.H. Ingold et al., Correlation of high pressure sodium lamp performance with arc tube transmission properties, Journal of IES (1982) pp. 223-229.

* cited by examiner

_US 7,897,098 B2_

HIGH TOTAL TRANSMITTANCE ALUMINA DISCHARGE VESSELS HAVING SUBMICRON GRAIN SIZE

CROSS REFERENCES TO RELATED APPLICATIONS

This Application is a division of copending application Ser. No. 10/907,014, filed Mar. 16, 2005.

BACKGROUND OF THE INVENTION

Translucent polycrystalline alumina (PCA) ceramic has made possible present-day high-pressure sodium (HPS) and ceramic metal halide lamps. The arc discharge vessels in these applications must be capable of withstanding the high temperatures and pressures generated in an operating lamp as well be resistant to chemical attack by the fill materials. In addition, the discharge vessels are typically required to have >92% total transmittance in the visible wavelength region from about 400 nm to about 700 nm in order to be useable in commercial lighting applications.

In HPS lamps, the discharge vessels are tubular, whereas for ceramic metal-halide lamps discharge vessels can range from a cylindrical shape to an approximately spherical shape (bulgy). Examples of these types of arc discharge vessels are given in European Patent Application No. 0 587 238 A1 and U.S. Pat. No. 5,936,351, respectively. The bulgy shape with its hemispherical ends yields a more uniform temperature distribution, resulting in reduced corrosion of the PCA by the lamp fills.

Because PCA is translucent and not transparent, the use of PCA is limited to non-focused-beam lamp applications. Birefringent grain scattering is a major source of in-line transmittance loss in regular, sintered PCA, and in-line transmittance generally increases with increasing grain size. Reducing the grain size of sinter-HIPed PCA to the submicron range (<1 micrometer) shifts the scattering mechanism thereby decreasing grain birefringent scattering. In the submicron region, the in-line transmittance actually increases with decreasing grain size. The high in-line transmittance and mechanical strength of submicron-grained PCA are of interest for focused-beam, short-arc lamps, that offer improved luminance, efficacy, and color rendition.

Magnesia (MgO) is typically required as a sintering aid in the manufacture of alumina discharge vessels in order to retard grain growth and facilitate grain boundary diffusion while pinning grain boundaries. Submicron alumina ceramics based on nano-sized starting powders generally require a higher level MgO to reach full density than larger-grained (10-30 microns) alumina based on micron-sized starting powders. This is because nano-sized powder requires a higher level of MgO dopant to cover the surface of the finer particles. Moreover, unlike the larger-grained alumina, the MgO-based dopants (e.g. ~200-300 ppm) become completely dissolved in lattice and grain boundary region. As a result, high levels of color centers can form including a variety of single and double oxygen vacancies with one or two electrons. These color centers absorb light which result in a low total transmittance (~78%) for MgO-doped, submicron-grained alumina discharge vessels despite their high in-line transmittance.

SUMMARY OF THE INVENTION

The present invention overcomes the problem of low total transmittance in MgO-doped, submicron-grained alumina discharge vessels by a post-sinter-HIP anneal. The anneal is believed to alter the ionization and association states of the color centers, but not significantly change the total population of oxygen vacancies. The temperature, time, and partial pressure of oxygen of the annealing atmosphere are controlled so that significant portions of light-absorbing oxygen vacancies are converted to non-light-absorbing oxygen vacancies while at the same time a stable microstructure is maintained (no significant grain growth or precipitation of magnesium aluminate spinel second phase particles). As a result, the post-sinter HIP anneal effectively brings the total transmittance up to >92% in the range from about 400 nm to about 700 nm, a level suitable for commercial lamp applications.

In accordance with an aspect of the invention, there is provided a method of making a ceramic discharge vessel comprising: (a) forming the discharge vessel with a submicron-grained alumina powder doped with MgO; (b) sinter-HIPing the discharge vessel; and (c) annealing the discharge vessel to increase the total transmittance of the discharge vessel to >92% in a wavelength range from about 400 nm to about 700 nm.

In accordance with another aspect of the invention, there is provided a ceramic discharge vessel comprising a ceramic body comprised of a submicron-grained alumina doped with MgO, the discharge vessel having a total transmittance of greater than 92% in a wavelength range from about 400 nm to about 700 nm.

It is expected that additional co-doping of the PCA with $ZrO_2$, $Y_2O_3$, $Er_2O_3$, $Yb_2O_3$, $Sc_2O_3$, etc., may alter the relative population of the point defects, but the problem of low total transmittance is expected to still exist because of the presence of MgO. Thus, the method of this invention should be useful to increase the total transmittance of such co-doped alumina ceramics.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
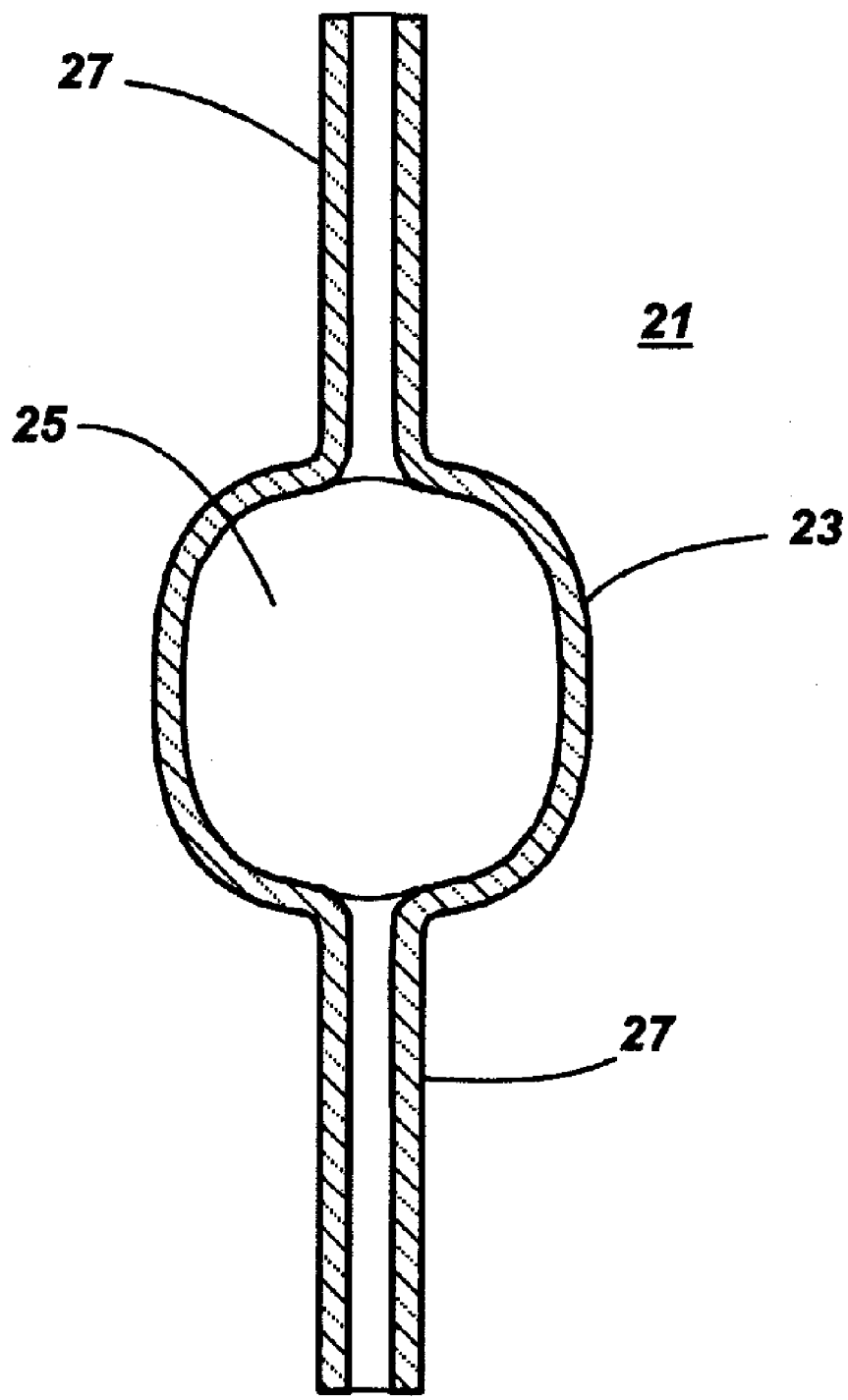
FIG. 1 is a cross-sectional illustration of a bulgy-shaped discharge vessel according to this invention.

FIG. 1 is a cross-sectional illustration of an arc discharge vessel according to this invention. The arc discharge vessel 21 has a ceramic body 23 which is comprised of submicron-grained polycrystalline alumina doped with MgO. The ceramic body 23 has a total transmittance of greater than 92% in the wavelength range from about 400 nm to about 700 nm. More preferably, the total transmittance is greater than 95% over the same wavelength range. The body 23 defines an arc discharge cavity 25 and has two capillaries 27 extending outwardly in opposite directions from the discharge cavity 25. Preferably, the thickness of the discharge cavity wall is about 0.8 mm. The capillaries are suitable for receiving, and sealing therein, electrode assemblies (not shown) which provide a conductive path for supplying electric power to the discharge vessel in order to strike and sustain an arc within the discharge cavity. Although the embodiment shown in FIG. 1 is a bulgy-shaped arc discharge vessel, other suitable shapes for the arc discharge vessel of this invention include tubular arc discharge vessels similar to HPS arc tubes.

Ceramic discharge vessels formed from a high-purity, finely divided aluminum oxide (alumina) powder may be consolidated by isopressing, slip casting, gel casting, or injection molding. The MgO dopant is generally added to the alumina powder prior to consolidation. Preferably, the MgO dopant in the alumina powder ranges from about 200 ppm to about 800 ppm and the alumina powder has a mean particle size of about 150 nm. The details of various methods of manufacturing green ceramic bodies for discharge vessels are described in, for example, European Patent No. 0 650 184 B1 (slip casting), U.S. Pat. No. 6,399,528 (gel casting), International Patent Application No. WO2004/007397 A1 (slip casting) and European Patent Application No. EP 1 053 983 A2 (isopressing).

In the case of single-piece, hollow-core vessels, such as the bulgy-shaped discharge vessel, a fugitive core may be used in conjunction with a shaping (e.g., gel-casting) method to form the discharge vessel. To remove the core after shaping, the green body containing the fugitive core (such as wax) is heated slowly to the melting point of the core (~50° C. for wax), allowing the molten core material to drip and flow out of the inside cavity. In a preferred method, the binder materials are removed by slow heating in flowing air to 800° C. Too fast a heating rate may cause binder entrapment inside the densified powder compact, which causes the final sinter-HIPed sample to have a gray hue. Presintering is conducted at 1250-1270° C. for 2 h in air to reach a state of closed porosity. The presintered parts are hot isostatically pressed (HIPed) and sintered at 1270° C. under ~10 ksi argon.

Figure 2:
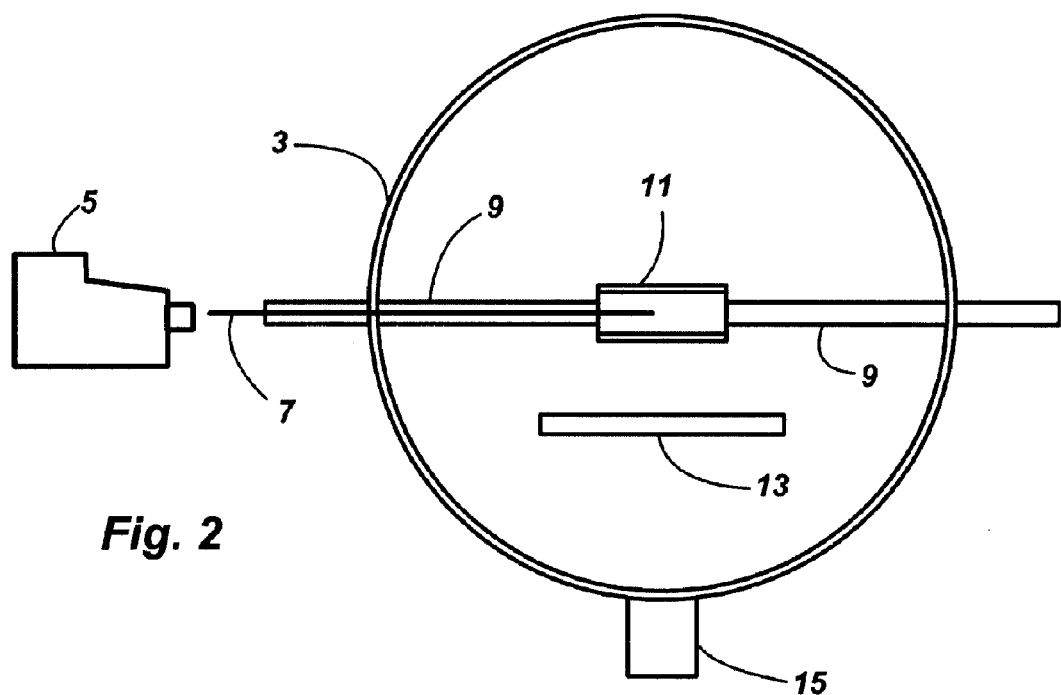
FIG. 2 is a schematic illustration of an apparatus for measuring the total transmittance of a discharge vessel.
Figure 3:
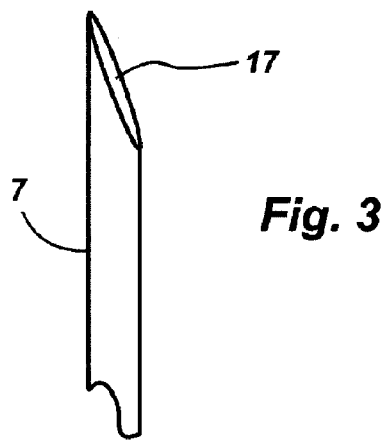
FIG. 3 is a magnified view of the tapered end of the optical fiber used in the apparatus shown in FIG. 2.

The total transmittance of the discharge vessels can be measured by illuminating one end of a small light pipe with a tungsten halogen lamp, placing the other end inside the hollow body, and measuring the total integrated flux of light passing out of the discharge vessel over the wavelength range from about 400 nm to about 700 nm. A schematic illustration of an apparatus for measuring the total transmittance is shown in FIG. 2. The sample 11 (in this case a tubular vessel) is mounted in a center region of integrating sphere 3 by supports 9 which hold the sample at opposite ends. A baffle 13 is positioned between the sample 11 and light detector 15. Optical fiber 7 is inserted through one of the supports 9 and into a center portion of the sample 11. Light is conducted from tungsten-halogen lamp 5 through the optical fiber 7. As shown in FIG. 3, the light-emitting end 17 of the optical fiber 7, which is placed inside the sample, has a 20° taper with respect to the cylindrical axis of the fiber in order to scatter the emitted light to produce a nearly point source. The light emitted from the end of the optical fiber passes through the sample wall, is collected by the integrating sphere, and the total integrated flux is measured by the light detector, preferably an unfiltered silicon detector. The percentage of the total integrated flux transmitted through the sample (compared to the total integrated flux emitted by the optical fiber alone) represents the total transmittance of the sample. Since the transmittance of the plastic optical fiber falls off at either end of the visible spectrum, i.e., less than about 400 nm and greater than about 700 nm, the total transmittance is effectively measured in the wavelength range from about 400 nm to about 700 nm. Suitable components for the apparatus are available from Labsphere, Inc. of North Sutton, N.H.

EXAMPLES

Both disks (~25 mm diameter by 0.8 mm thick) and 70 W bulgy-shaped discharge vessels were made by sinter-HIPing. The starting submicron-grained alumina powder had a 150 nm mean particle size and was doped with 220 ppm MgO. For the disks, the measured in-line transmittance was typically quite uniform within the same disk, and from disk to disk. The as-made, sinter-HIPed bodies had very few residual pores. The average grain size was about 0.5 microns. Grain size was determined by multiplying a factor of 1.5 to the intercept size measured using images acquired via scanning electron microscopy (SEM).

The total transmittance values measured for the sinter-HIPed discharge vessels (polished or non-polished with a 0.8-mm wall thickness) were relatively low, ranging from 69-87% with an average of about 77%. The spectrophotometer in-line transmittance of polished 0.8 mm-thick disks at 600 nm was measured as 50-55%. After annealing at 1025-1150° C. in air for various durations (2-4 h), the total transmittance of sinter-HIPed, submicron-grained alumina vessels increased to 87-98% (Table 1). The scatter in the total transmittance may be attributed to the different levels of point defects, brought about by a location-specific, partial pressure of oxygen in the hot isostatic press. Only about 10 out of 30 annealed vessels were fairly colorless, while most of them were brownish. This undesirable brown color is believed to be related to point defects. The brown color was one reason that air anneal could not increase the total transmittance to >92% for a number of vessels.

The total transmittance remained unchanged even after re-firing the vessels in wet hydrogen at 1100° C. for 2 h. Since wet hydrogen firing typically increases the transmittance of dry-hydrogen (very low $P_{O2}$)-sintered PCA, the fact that the total transmittance remained unchanged in this case indicates that the partial pressure of oxygen during HIPing was probably even more reducing than a dry $H_2$ environment ($P^{O2}<1\times 10^{-12}$ atm).

Annealing several of the air-annealed samples under a Ar-5 ppm $O_2$ atmosphere ($P_{O2}=5\times 10^{-6}$ atm) at 1100° C. for 2 hours increased the total transmittance of the submicron-grained discharge vessels from 87-96% to 91-97% as shown in Table 1 (in-line transmittance is given in parentheses). These samples also became visually less colored. This means that, in terms of minimizing light-absorbing color centers, a $P_{O2}$ of $5\times 10^{-6}$ atm in the anneal atmosphere is much better than that of air ($P_{O2}\sim 0.2$ atm) or wet hydrogen (($P_{O2}<1\times 10^{-12}$ atm).

The $P_{O2}$ and temperature ranges in the post-sinter-HIP anneal are dictated by the thermodynamics of the point defects and their diffusion rates, whereas the annealing time and MgO levels depend on the thickness of the final part and the particle size of the starting powder. Preferably, the annealing atmosphere is an inert gas, e.g., nitrogen or argon, that has a partial pressure of oxygen from about $1\times 10^{-3}$ atm to about $1\times 10^{-9}$ atm, and more preferably about $1\times 10^{-5}$ atm to about $1\times 10^{-7}$ atm.

If the anneal temperature is too high, spinel precipitates will form, in-line transmission loss occurs, and grains/residual pores grow to make the parts opaque. The annealing temperature may range preferably from about 1000° C. to about 1150° C. and the annealing time preferably may range from about 1 hour to about 20 hours. In a more preferred embodiment, the annealing temperature is about 1100° C. and the annealing time is about 2 hours.

TABLE 1

Total Transmittance (%) (and In-line Transmittance (%))
Before and After Anneals

| Samples | As-made | After Air Anneal | Ar- 5 ppm $O_2$ Anneal |
|---|---|---|---|
| As-HIPed and polished | 89.5 (2.03) | 95.6 (1.85) | 97.4 (2.02) |
| As-HIPed and polished | 81.3 (3.68) | 93.4 (3.22) | 96.1 (3.60) |
| As-HIPed | 73.1 (2.32) | 90.6 (2.22) | 93 (2.04) |
| As-HIPed | 73.6 (3.5) | 88.8 (2.90) | 94.3 (3.01) |
| As-HIPed | 71.4 (2.94) | 89.9 (2.87) | 94.1 (2.96) |
| As-HIPed | 69.1 (3.35) | 89.2 (3.38) | 94.8 (3.42) |
| As-HIPed | 74.4 (2.39) | 89.4 (2.49) | 96 (2.27) |
| As-HIPed | 69.5 (2.16) | 88.9 (2.39) | 94 (2.09) |
| As-HIPed | 76.1 (3.88) | 90.3 (2.31) | 96.4 (3.39) |
| As-HIPed | 77.6 (2.49) | 89 (2.52) | 93.2 (2.40) |
| As-HIPed | 72.6 (3.34) | 88.5 (3.39) | 94.4 (4.09) |
| As-HIPed and polished | 84.2 (3.82) | 91.5 (3.83) | 96.5 (3.66) |
| As-HIPed | 72.5 (2.24) | 87 (3.10) | 92.3 (3.72) |
| As-HIPed | 72.7 (3.46) | 89.6 (3.41) | 95.5 (3.05) |
| As-HIPed | 78.7 (3.54) | 87.6 (2.71) | 91.4 (2.67) |
| As-HIPed and polished | 88 (4.23) | 93 (3.90) | 96.9 (4.6) |
| As-HIPed and polished | 85.8 (4.34) | 92.7 (4.43) | 97.2 (5.06) |
| As-HIPed and polished | 88.4 (6.52) | 92.6 (5.00) | 96.7 (5.60) |

UHP-grade $N_2$ gas typically contains 0.1-1 ppm oxygen ($P^{O2}$=0.1-1×10$^{-6}$ atm), and as such should be a favorable gas for anneal. Table 2 shows that after annealing at 1100° C. for 2 h in nitrogen, the total transmittance increased to >92%. Moreover, it was shown in another experiment that a direct anneal for 20 hours at 1150° C. in UHP-grade $N_2$ of an as-sinter-HIPed, submicron-grained discharge vessel increased total transmittance from 74.5% to 97.2%.

TABLE 2

Total Transmittance (%) (and In-line Transmittance (%))
Before and After Various Anneals

| Samples | As sinter-HIPed | After Air Anneal | After Ar-5 ppm $O_2$ Anneal | After UHP-grade $N_2$ Anneal |
|---|---|---|---|---|
| As-HIPed | 73.1 (2.32) | 90.6 (2.22) | 93 (2.04) | 93.9 (4.40) |
| As-HIPed | 78.7 (3.54) | 87.6 (2.71) | 91.4 (2.67) | 92.2 (2.56) |
| As-HIPed and polished | 82.9 (3.74) | 92.5 (3.65) | 96.7 (4.05) | 98.1 (4.16) |
| As-HIPed and polished | 87.5 (4.23) | 92.3 (4.47) | 96.1 (4.30) | 97.5 (4.40) |
| As-HIPed | 65.9 (1.61) | 97.3 (1.98) | — | 97.4 (2.24) |

The data clearly show the benefits of post-sinter-HIP anneal in increasing the total transmittance to >92%, the level required for commercial lighting applications. The anneal temperature and time conform to the temperature limit required for microstructural and transparency (in-line transmittance) stability.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A method of making a ceramic discharge vessel comprising:
   (a) forming the discharge vessel with a submicron-grained alumina powder doped with MgO, the discharge vessel having a wall having a thickness of about 0.8 mm;
   (b) sinter-HIPing the discharge vessel; and
   (c) annealing the discharge vessel in an annealing atmosphere containing a partial pressure of oxygen of about $1 \times 10^{-3}$ atm to about $1 \times 10^{-9}$ atm to increase the total transmittance of the discharge vessel to >92% in a wavelength range from about 400 nm to about 700 nm.

2. The method of claim 1 wherein the discharge vessel is annealed at about 1000° C. to about 1150° C.

3. The method of claim 2 where the discharge vessel is annealed for about 1 hour to about 20 hours.

4. The method of claim 1 wherein the discharge vessel is annealed at about 1100° C. for about 2 hours.

5. The method of claim 1 wherein the partial pressure of oxygen is about $1 \times 10^{-5}$ atm to about $1 \times 10^{-7}$ atm.

6. The method of claim 5 wherein the discharge vessel is annealed at about 1000° C. to about 1150° C.

7. The method of claim 6 where the discharge vessel is annealed for about 1 hour to about 20 hours.

8. The method of claim 7 wherein the discharge vessel is formed with a submicron-grained alumina powder doped with about 200 ppm to about 800 ppm MgO.

9. The method of claim 8 wherein the annealing atmosphere is comprised of nitrogen or argon.

10. The method of claim 1 wherein the discharge vessel is formed with a submicron-grained alumina powder doped with about 200 ppm to about 800 ppm MgO.

11. The method of claim 10 wherein the submicron-grained alumina powder has a mean particle size of about 150 nm.

12. The method of claim 1 wherein the annealing atmosphere is comprised of nitrogen or argon.

* * * * *